United States Patent [19]
Sandstrom et al.

[11] Patent Number: 6,154,441
[45] Date of Patent: Nov. 28, 2000

[54] METHOD FOR CENTERING A HUB IN AN OPTICAL DISC, AND AN OPTICAL STORAGE SYSTEM USING SUCH DISC

[75] Inventors: Chad R. Sandstrom, Stillwater, Minn.; Brian T. Bonn, Scotts Valley, Calif.

[73] Assignees: Imation Corp., St. Paul, Minn.; TeraStor Corporation, San Jose, Calif.

[21] Appl. No.: 08/839,874

[22] Filed: Apr. 17, 1997

[51] Int. Cl.⁷ .................................................. G11B 7/24
[52] U.S. Cl. ............................................................ 369/282
[58] Field of Search ........................... 369/282, 290–291, 369/270–271; 360/135

[56] References Cited

U.S. PATENT DOCUMENTS

| | | | |
|---|---|---|---|
| 4,351,047 | 9/1982 | Redlich et al. | 369/270 |
| 4,459,628 | 7/1984 | Barton | 360/133 |
| 4,785,444 | 11/1988 | Nakane et al. | 369/290 |
| 4,797,764 | 1/1989 | Doering | 360/135 |
| 4,899,244 | 2/1990 | Morse | 360/133 |
| 5,125,750 | 6/1992 | Corle et al. | 359/819 |
| 5,202,880 | 4/1993 | Lee et al. | 369/275.4 |
| 5,323,381 | 6/1994 | Takahashi et al. | 369/290 |
| 5,460,763 | 10/1995 | Asai | 264/107 |
| 5,470,627 | 11/1995 | Lee et al. | 428/64.4 |
| 5,476,700 | 12/1995 | Asai et al. | 360/135 |
| 5,504,735 | 4/1996 | Ota et al. | 369/282 |
| 5,532,519 | 7/1996 | Bertin et al. | 257/777 |
| 5,535,081 | 7/1996 | Nelson et al. | 360/133 |
| 5,552,634 | 9/1996 | Schneider | 257/706 |
| 5,590,115 | 12/1996 | Kubo | 369/290 |
| 5,650,899 | 7/1997 | Schick et al. | 360/133 |
| 5,709,764 | 1/1998 | Funawatari et al. | 369/290 |
| 5,827,593 | 10/1998 | Markyama et al. | 428/64.1 |
| 5,862,026 | 1/1999 | Schick et al. | 360/133 |
| 5,869,891 | 2/1999 | Rostoker et al. | 257/712 |

FOREIGN PATENT DOCUMENTS

| | | |
|---|---|---|
| 0 386 971 A1 | 9/1990 | European Pat. Off. . |
| 0 497 604 A2 | 8/1992 | European Pat. Off. . |
| 0 499 413 A1 | 8/1992 | European Pat. Off. . |
| 0 516 329 A2 | 12/1992 | European Pat. Off. . |
| 0 553 035A2 | 1/1993 | European Pat. Off. . |
| 0 566 032 A2 | 10/1993 | European Pat. Off. . |
| 60-15874 | 1/1985 | Japan . |
| 63-249987 | 10/1988 | Japan . |
| 2-281487 | 11/1990 | Japan . |
| 6-20303A | 1/1994 | Japan . |
| 6-168560A | 6/1994 | Japan . |
| 7-37354 | 2/1995 | Japan . |
| 7-110996A | 4/1995 | Japan . |
| 7-182818A | 7/1995 | Japan . |
| 8-22639A | 1/1996 | Japan . |
| 8-77610A | 3/1996 | Japan . |
| 8-203129A | 8/1996 | Japan . |
| 8-247137A | 9/1996 | Japan . |

OTHER PUBLICATIONS

Marchant, Alan B., "Optical Recording", *Addison–Wesley Publishing Company*, Reading, MA, XP–002072829 pp. 313–316 (1990).

*Primary Examiner*—Brian E. Miller
*Attorney, Agent, or Firm*—Dicke, Billig & Czaja, P.A.

[57] ABSTRACT

Optical storage system including a disc drive and an optical media having a low radial total indicated runout and method of manufacturing such media. The optical media includes a disc substrate having a formatted surface and a center hole. A disc alignment mechanism is provided, wherein the concentric registration of the formatted surface is specified relative to the disc alignment mechanism. A hub having a center hole is positioned at the disc center hole, wherein the hub center hole is centered relative to the disc alignment mechanism. The disc drive includes a drive spindle and a center pin extending from the drive spindle for centering the drive spindle to the optical media.

20 Claims, 7 Drawing Sheets

METHOD FOR CENTERING A HUB IN AN OPTICAL DISC, AND AN OPTICAL STORAGE SYSTEM USING SUCH DISC

TECHNICAL FIELD

The present invention relates generally to the field of optical storage systems, and in particular, to an optical storage system, including an optical disc having a low radial total indicated runout error, wherein the optical disc is capable of containing a high capacity of information therein, and method of manufacturing such a disc.

BACKGROUND OF THE INVENTION

Optical data discs are a popular media choice for the distribution, storage and accessing of large volumes of data. This includes audio and video program material, as well as computer programs and data. Formats of optical data discs include audio CD (compact disc), CD-R (CD-readable), CD-ROM (CD-read only memory), DVD (digital versatile disc or digital video disc) media, DVD-RAM (random access memory), various types of rewritable media, such as magneto-optical (MO) discs (including near field recording technology), and phase change optical discs. In general, optical discs (such as CD-ROMs) are produced by making a master which has physical features representing the data formed in or on a reference surface therein. The master is used to make a stamper, which, in turn, is used to make production quantities of replica discs, each containing the data and tracking information which was formed in the master. The high data capacity, convenience, and relatively low production costs of such discs have contributed to their great success and acceptance in the marketplace.

In optical discs, data is stored as a series of lower reflectance "pits" embossed within a plane of higher reflectance "lands". The microscopic pits are formed on the surface of the plastic disc when the disc material is injected into a mold. Typically, the pitted side of the disc is then coated with a reflectance layer, such as a thin layer of aluminum, and in the case of a CD, followed by a protective layer of lacquer. The pits on an optical disc can be arranged in a spiral track originating at the disc center hub and ending at the disc outer rim, wherein each data track is defined as a cycle of the spiral. The data can also lie in a series of concentric data tracks spaced radially from the center hub.

To read the data on an optical disc, an optical disc player shines a small spot of laser light through the disc substrate onto the data layer as the disc rotates. The intensity of the light reflected from the disc's surface varies according to the presence (or absence) of pits along the information track. When a pit lies directly underneath the "readout" spot, much less light is reflected from the disc than when the spot is over a flat part of the track. A photodetector and other electronics inside the player translate this variation into the 0s and 1s of the digital code representing the stored information.

As optical disc technology has evolved, optical discs have increased in storage capacity. Higher density discs have resulted in the storage of a greater amount of information within the same size of disc area. For example, a CD having a storage capacity of 0.65 gigabytes has data pits which are 0.83 $\mu$m long and has a track pitch (the distance between data tracks) of approximately 1.6 $\mu$m. In comparison, a DVD disc data pit is as small as 0.4 $\mu$m long, and a track pitch of only 0.74 $\mu$m, resulting in a storage capacity of 5 gigabytes on a single layer. Similarly, MO and phase change disc track pitch varies with the density or storage capacity of the disc.

To read high-capacity optical discs having smaller pits and a smaller track pitch, the optical disc player's read beam must achieve a smaller spot focus. Further, data must be more precisely located on the optical disc substrate. Ideally, the data tracks are concentrically located about the center hole of the disc. During the optical disc manufacturing process, a centering error is introduced into the radial positioning of the data tracks (or track cycles) on the optical disc. This error is known as radial total indicated runout (RTIR). RTIR is defined as the measure of non-concentricity of the data tracks to the drive spindle on the optical disc player.

In a conventional optical disc manufacturing process, RTIR error is introduced during the injection molding process. A typical injection molding process begins with a tooling mechanism. The optical tooling mechanism includes a fixed side and a moving side. The moving side typically includes a stamper for replicating data and format information into the disc substrate, and a movable gate cut for cutting a central opening in the disc substrate. The stamper is located by an inner holder, wherein the inner holder fits over the stamper. Several more parts may be located at the center inside diameters of the tool. In typical optical tooling, all of these parts need to remain concentric between the gate cut and the removable inner holder for concentric registration (or centering) of the format information (data tracks) in the disc substrate relative to the disc central opening or center hole.

In a disc molding process, a resin, typically polycarbonate, is forced in through a sprue channel into a substrate cavity within the optical tooling (mold) to form the optical disc substrate. The format of the grooves and pits are replicated in the substrate by the stamper as the cavity is filled. After filling, the gate cut is brought forward to cut a center hole in the optical disc. After the part has sufficiently cooled, the optical tooling mold is opened and the sprue and product eject are brought forward for ejecting the formed optical disc off of the stamper. The inner holder may be removed to allow change out of the stamper.

Any misalignment of the aforementioned optical tooling results in the replication of greater RTIR error in the molded disc. Further, any debris, flash or other imperfections resulting from the gate cut action, and any misalignment of the moving stamper relative to the fixed side of the optical tooling will add to the RTIR error. When track pitch is larger, such as in CD optical discs, the disc reader is capable of reading optical discs having typical RTIR errors between 50 and 100 $\mu$m due to a relatively large track pitch (1.6 $\mu$m). For higher capacity discs, such as DVD discs, it is difficult (or impossible) for an optical reader to read a DVD optical disc having an RTIR error greater than 50 $\mu$m, due to the smaller track pitch. Similar problems exist with MO disc technology having a typical RTIR between 20 and 30 $\mu$m In order to reduce the RTIR error to acceptable (or readable) levels, hubs are installed within the center opening of the optical disc. A new center is located, and the hub is installed centered on the disc relative to the formatted data tracks. This is typically accomplished using a costly centering process. Further, the hub itself is insert molded, resulting in a high expense relative to the total disc cost.

It is desirable to have an optical storage system including a high-capacity optical disc having a low RTIR error. It is desirable to have a high-capacity optical disc having low RTIR which utilizes an economically efficient method of centering the drive to the information on the disc. Further, it is desirable to have a disc molding process for forming high-capacity optical discs which may include simple modifications to conventional optical tooling, and which introduces low RTIR error into the disc substrate.

SUMMARY OF THE INVENTION

The present invention includes an optical storage system, including a high-capacity optical disc having a low RTIR error. The present invention also includes a disc molding and manufacturing process for forming high-capacity optical discs which includes optical tooling which introduces low RTIR error into the disc substrate.

In one embodiment, the present invention is an optical storage system including a disc drive and an optical media having a low radial total indicated runout. The optical media includes a disc substrate having a center hole, the disc substrate including a formatted surface and a central region, wherein the central region is located between the formatted surface and the center hole. A disc alignment mechanism is located within the central region, wherein the concentric registration of the formatted surface is specified relative to the disc alignment mechanism. A hub having a hub center hole is located at the disc substrate center hole, wherein the hub center hole is centered relative to the disc alignment mechanism. The disc drive includes a drive spindle and a center pin extending from the drive spindle for centering the drive spindle to the optical media.

The formatted surface may include a plurality of generally concentric tracks, wherein each track can be defined as a concentric ring or a cycle of a spiral of a track. The disc alignment mechanism may be integrally molded with the disc substrate. The disc alignment mechanism may include an annular ridge extending from the disc substrate. The optical storage system may further include means for coupling the drive spindle to the optical media. The means for coupling may include a magnetic material coupled to the drive spindle for magnetically coupling the optical media to the drive spindle.

In another embodiment, the present invention includes an optical disc for the storage of a high-capacity of information therein. The optical disc includes a disc substrate having a center hole, the disc substrate includes a formatted surface and a central portion, wherein the formatted surface includes a plurality of spiral or concentric tracks, and wherein the central portion is located between the formatted surface and the center hole. A disc alignment mechanism is located at the central region, wherein the concentric registration of the formatted surface is specified relative to the disc alignment mechanism. A hub is located within the center hole, wherein the hub is centered relative to the disc alignment mechanism. The disc alignment mechanism may include an annular ridge and may be integrally molded with the disc substrate. The optical disc has a low total indicated runout error.

The hub may include a hub coupling mechanism for coupling the hub to a disc drive. The hub coupling mechanism may be formed of a ferromagnetic material. The hub may be formed of a polymer material having a high density of magnetic material contained therein. In one embodiment, the hub is formed of a homogeneous magnetic polymer. In another embodiment, the hub includes a generally cylindrically shaped body and a flange extending from the generally cylindrically shaped body. The flange may be secured to the disc substrate. The disc substrate may include a surface having a depression located about the center hole, wherein the flange is secured to the disc substrate within the depression. The depth of the depression may be greater than the thickness of the flange.

In another embodiment, the present invention includes a method of centering a hub relative to a formatted surface of an optical disc capable of containing a high capacity of information therein. The optical disc having a low radial total indicated runout error. The method includes molding a disc substrate having a center hole, the disc substrate including the formatted surface and a central region, wherein the central region is located between the formatted surface and the center hole. A disc alignment mechanism is formed within the central region, wherein the concentric registration of the formatted surface is specified relative to the disc alignment mechanism. A hub is centered within the center hole relative to the disc alignment mechanism. The hub may include a center hole, wherein the hub center hole is centered relative to the disc alignment mechanism. The disc alignment mechanism may be an annular ring.

The centering of the hub may further include the step of providing a jig having a centering mechanism and a center pin, wherein the center pin is centered on the jig relative to the centering mechanism. The centering mechanism is matable with the disc alignment mechanism. The disc substrate is placed on the jig, wherein the disc alignment mechanism is mated with the centering mechanism. The hub is placed over the center pin and the hub is secured to the disc substrate. The hub may be secured to the disc substrate with an adhesive. The hub may be placed over the center pin by passing the center pin through the hub center hole.

In another embodiment, the present invention includes a stackable optical disc. The stackable optical disc includes a disc substrate having a first side and a second side, including a formatted surface therein. A stacking mechanism may extend from the disc substrate. Means are provided integral the disc substrate for providing radial support during stacking of the optical disc.

The stacking mechanism may include an annular ridge. The means for providing radial support may be a depression in the disc surface. The depression may be formed to receive the stacking mechanism.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
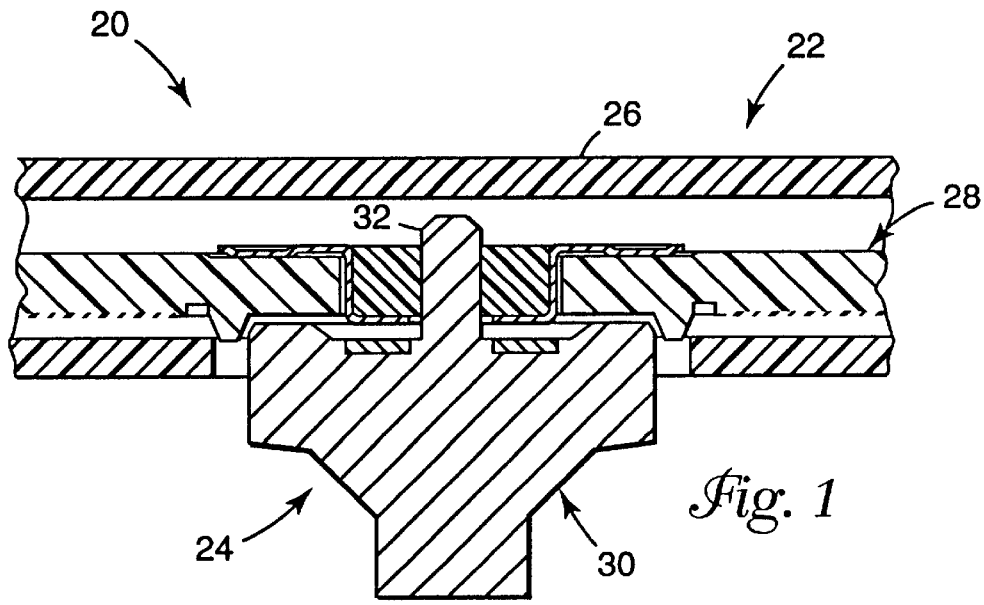
FIG. 1 is a partial cross-sectional view of an optical storage system in accordance with the present invention.

In FIG. 1, an optical storage system in accordance with the present invention is generally shown at 20. The optical storage system 20 includes an optical disc cartridge 22 coupled to an optical disc reader 24 (partially shown). In particular, the optical disc cartridge 22 includes a cartridge shell 26 having an optical disc 28 contained therein. The optical disc reader 24 includes an optical disc drive spindle 30 having a center pin 32 extending therefrom.

The optical disc cartridge 22 is centered on the optical disc reader 24. Optical disc 28 has a low radial total indicated runout (RTIR), and as such can include a high capacity of data contained therein. The optical disc 28 is centered on the drive spindle 30, and more particularly, the data contained on the optical disc 28 is concentrically located relative to the center pin 32. As such, a high capacity of data may be contained on optical disc 28 with a low RTIR, allowing optical disc 28 to be read using optical disc reader 24.

Figure 2:
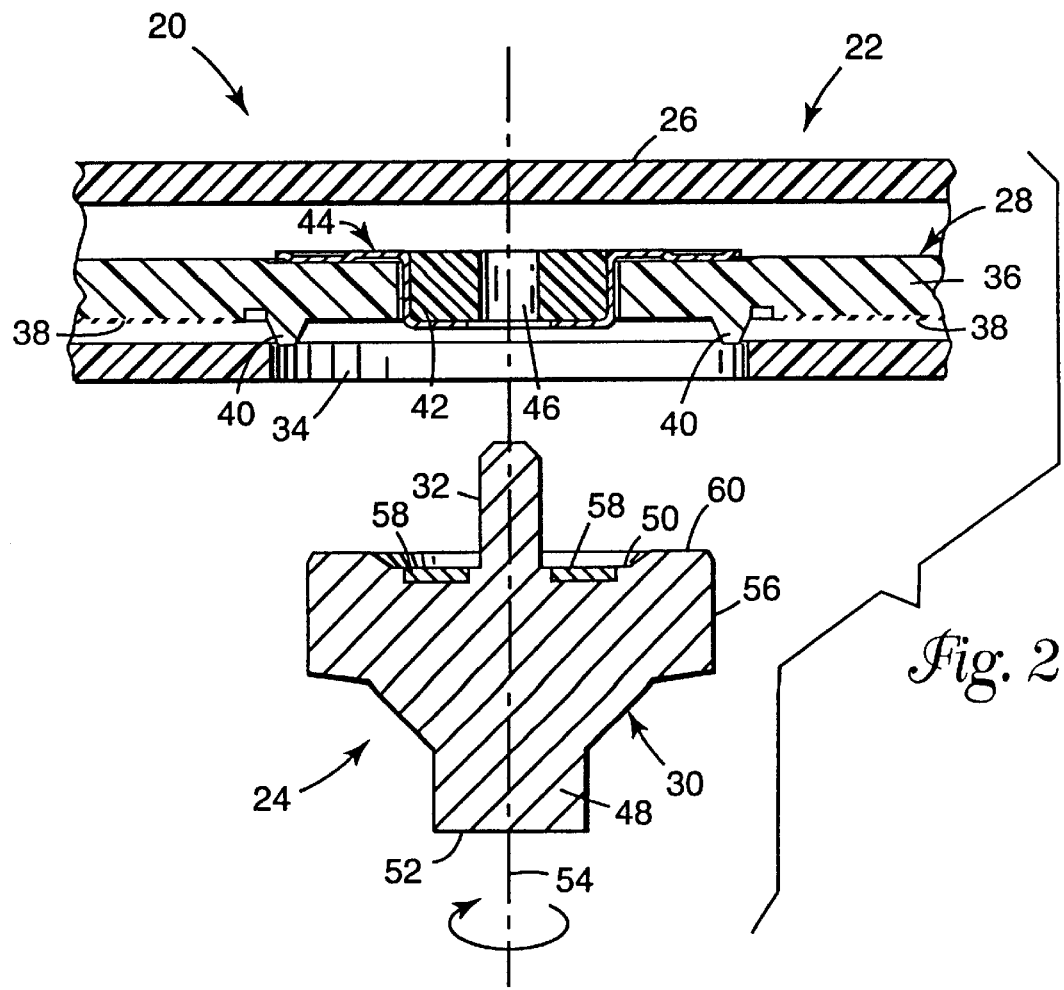
FIG. 2 is an expanded view of the optical storage system shown in FIG. 1.

In FIG. 2, the optical storage system 20 is shown in expanded view. The optical disc 28 is rotatably contained within the cartridge shell 26. The cartridge shell 26 protects the optical disc 28 from damage and debris. The cartridge shell 26 includes a cartridge opening 34 which allows the drive spindle 30 to access the optical disc 28. When optical disc cartridge 22 is placed within optical disc reader 24, the drive spindle 30 is operated forward through the cartridge opening 34 to engage the optical disc 28 for rotation of the optical disc 28.

The optical disc 28 includes a disc substrate 36 having a formatted surface 38, a disc alignment mechanism 40, and a center hole 42. Located within the center hole 42 is a hub 44, having a hub center hole 46. The concentricity of formatted surface 38 is specified relative to the disc alignment mechanism 40 as a result of the optical disc manufacturing process. The hub 44 is located within center hole 42 and centered relative to the disc alignment mechanism 40. Hub center hole 46 is capable of receiving the optical disc drive spindle center pin 32. As such, when the optical disc drive spindle 30 is engaged with the optical disc 28, the center pin 32 extends through the hub center hole 46, and the optical disc 28 is centered on the optical disc drive spindle 30. More particularly the formatted surface 38 is concentrically located (centered) relative to the optical disc drive (at spindle 30).

With the present invention, the optical disc 28 can preferably be a high-capacity optical disc having a low RTIR. The optical disc 28 and method of manufacturing the optical disc 28 is described in greater detail later in the specification.

Disc drive spindle 30 includes a generally cylindrically shaped body 48 having a first end 50 and a second end 52. The first end 50 contacts and engages the optical disc 28. The second 52 is coupled to a drive mechanism (not shown) within the optical disc reader 24 for control and rotation of the drive spindle 30.

The center pin 32 is generally cylindrically shaped, and extends from the first end 50. The center pin 32 is centered along the longitudinal axis of rotation of the drive spindle 30, indicated at 54.

The drive spindle 30 further includes a flange 56 and a coupling mechanism 58. The flange 56 extends radially from the generally cylindrically shaped body 48 proximate the first end 50. The flange 56 provides support to optical disc 28 during engagement of the optical disc 28. In particular, the flange 56 includes a flange surface 60 which contacts the optical disc 28.

The coupling mechanism 28 can be located adjacent the center pin 32, and provides a coupling force between the disc drive spindle 30 and the optical disc 28. In one exemplary embodiment shown, the coupling mechanism 58 is formed of a ferro magnetic material, such as a magnet embedded within the drive spindle 30 (and may be connected to a power source) for providing electromagnetic coupling force between the optical disc 28 and the drive spindle 30.

In one preferred embodiment, the drive spindle body 48 is formed of a rigid material, preferably stainless steel. The center pin 32 is formed of stainless steel having a diameter for a precise tolerance fit within hub center hole 46. In one embodiment, the center pin 32 diameter is just less than 4 mm.

Figure 3:
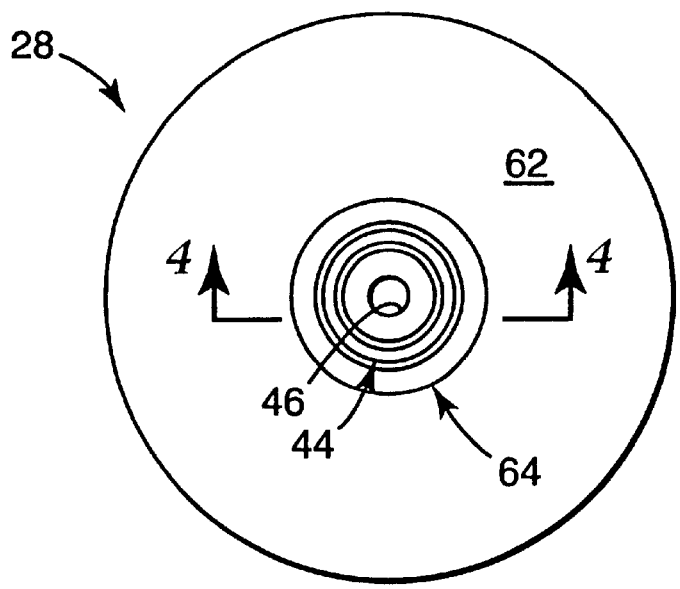
FIG. 3 is a plan view of an optical disc in accordance with the present invention.

In FIG. 3, a plan view of optical disc 28 is shown. The optical disc 28 is a low RTIR optical disc which is capable of containing a high capacity of data therein. The optical disc 28 can be similar to a read only or writable optical disc, such as CD ROM, DVD, MO, or phase change optical disc, as previously described herein. The optical disc 28 includes an information area 62 and a central portion 64. The information area 62 is capable of containing data encoded therein. The central portion 64 includes the hub 44 located therein.

Figure 4:
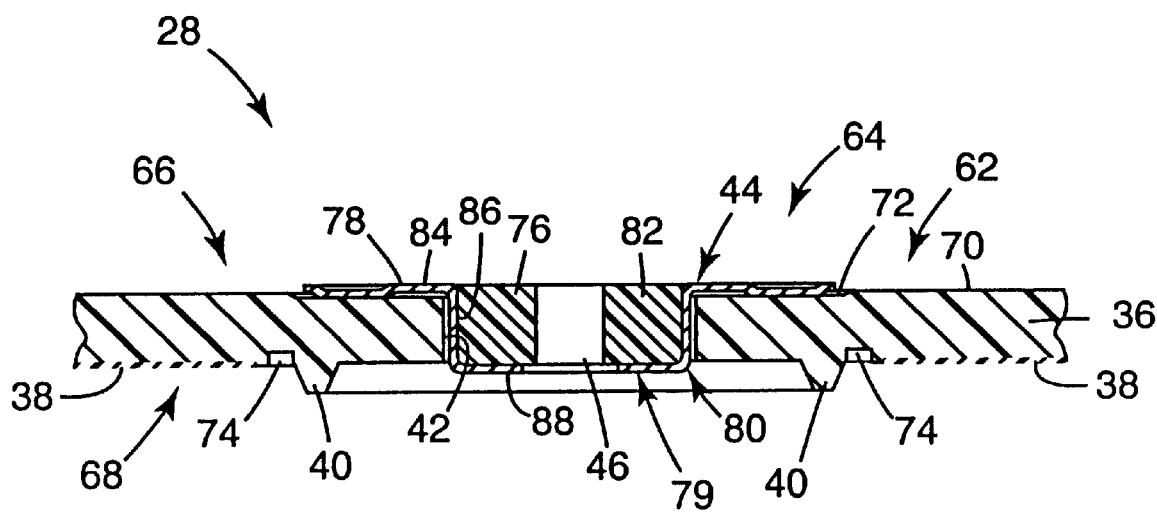
FIG. 4 is a partial cross-sectional view taken along line 4—4 of FIG. 3.

In FIG. 4, a partial cross-sectional view of the optical disc 28 is shown. The optical disc 28 includes a first side 66 and a second side 68. Located on the first side 66 is a disc surface 70 having a depression 72. The depression 72 is located within the central portion 64. The depression 72 extends below a plane as defined by the disc surface 70.

In the embodiment shown, the formatted surface 38 and the disc alignment mechanism 40 are located on the second side 68 of optical disc 28. The formatted surface 38 is located within information area 62, and the disc alignment mechanism 40 is located within the central portion 64. The central portion 64 may also include other features, indentations, or projections, such as groove 74, which may be formed within the optical disc 28 as a bi-product of the disc molding process. In a conventional disc molding process, the resulting groove 74 is 0.3 mm deep or less and is not shaped such that it is capable of functioning as a disc alignment mechanism.

Data may be stored within the formatted surface 38 as a series of lower reflectance "pits" bored within a plane of higher reflectance "lands". For CD-ROM optical discs, the microscopic pits may be formed on the surface of the disc substrate 36 during an injection molding process, which is described in detail later in the specification. The pits on the optical disc are arranged in a spiral track originating at the beginning of the information area 62, adjacent central portion 64, and ending at the disc outer edge. The spiral track can be defined as a plurality of generally concentric tracks, wherein each generally concentric track is a cycle of the spiral track. Alternatively, the formatted surface 38 may consist of a plurality of concentric tracks. Similarly, for writable optical discs, such as magneto optical disc or phase change optical discs, the data is encoded within the readable/ writable material arranged in a spiral track. In particular, the writable discs may include a spiral or concentric track formed in the disc substrate, wherein the data is encoded in the writable material located in the regions between these spiral tracks.

The concentricity of the data tracks located within the formatted surface 38 is specified relative to the disc alignment mechanism 40. The disc alignment mechanism 40 serves as a disc alignment feature for centering the optical disc drive spindle 30 to the data tracks on the formatted surface 38. In one preferred embodiment, the disc alignment mechanism 40 may be used for centering the hub 44 within the center hole 42 during the disc assembly process, such that the drive spindle 30 is centered relative to the data tracks on the formatted surface 38.

In the exemplary embodiment shown, the disc alignment mechanism 40 may be an annular member, ring or ridge generally concentrically located about the center hole 42. It is also recognized that the disc alignment mechanism 40 may consist of other features in the disc substrate. Due to the alignment mechanism 40, it is not required that center hole 42 be precisely centered relative to the formatted surface 38. The annular ring 40 extends as a molded projection from the surface of the optical disc substrate 36. In one preferred embodiment, the height of the annular ring 40 relative to the disc substrate 36 is preferably less than the thickness of the disc substrate 36, and must be sized and shaped such that it is capable of functioning as a disc alignment mechanism. In one preferred embodiment, the annular ring 40 extends 0.5 mm from the surface of the disc substrate 36. Alternatively, it is recognized that the disc alignment mechanism 40 may consist of a separately manufactured piece adhered to the disc substrate 36.

The hub 44 is centered relative to the data tracks on formatted surface 38 using disc alignment mechanism 40 during the optical disc assembly process. In the exemplary embodiment shown, the hub 44 includes a body 76 having an outward extending flange 78. The hub center hole 46 extends through the body 76. As the body 76 extends through the hub center hole 46, the flange 78 seats on the disc surface 70. In one preferred embodiment, the flange 78 seats within depression 72. The hub 44 is coupled to the disc substrate 36 at the disc surface 70 using an adhesive (not shown).

In one embodiment, the hub 44 includes a first piece 80 and a second piece 82. The first piece 80 is formed of pressed steel, and includes flange member 84, cylindrical side member 86, and bottom member 88. The flange member 84 extends in a first direction and forms the flange 56. The cylindrical side member 86 extends approximately 90 degrees downward from the flange member 84 in a second direction to form the side of hub 44. The bottom member 88 extends radially inward (in a third direction) approximately 90 degrees from the cylindrical side member 86. The second piece 82 is insert molded within the first piece 80, and more particularly, is contained by the cylindrical side member 86 and the bottom member 88. In this embodiment, the bottom member 88 performs the function of the hub coupling mechanism 79. In another embodiment, it is recognized that the hub 44 can be formed of a single macroscopically composite magnetic polymer. In this embodiment, the hub 44 may include a polymer composite which is loaded with a magnetic material to perform the coupling mechanism function.

The hub 44 is generally centrally located at the optical disc center hole 42. The hub 44, and specifically the hub center hole 46, is centered relative to the disc alignment mechanism 40. As such, the data tracks on the formatted surface 38 are concentrically located relative to the hub center hole 46 for centering the optical disc 28 on the optical disc drive spindle 30. It is recognized that hub 44 may extend into or across center hole 42.

The optical disc 20 has a low RTIR error during the reading of the disc. More specifically, since the data tracks on the formatted surface 38 are concentrically located relative to the disc alignment mechanism 40 during the disc forming process, a low RTIR error is introduced into the disc 28 during the manufacturing process. In turn, the hub center hole 46 is centrally located relative to the disc alignment mechanism 40. As such, the concentricity of the data tracks on the formatted surface 38 are specified relative to the hub center hole 46 with a low RTIR error.

In the exemplary embodiment shown, it is recognized that since the disc alignment mechanism 40 (shown as an annular ring) extends from the disc substrate 36, the disc alignment mechanism 40 may be used as a stacking mechanism to aid in stacking and handling a plurality of optical disc 28. When used as a stacking mechanism, the disc alignment mechanism 40 provides a separation between each optical disc 28, and separates the formatted surface 38 from contact with an adjacent disc. The use of the disc alignment mechanism 40 as a stacking mechanism during the optical disc 28 manufacturing process will be described in detail later within the specification.

In one exemplary embodiment, the optical disc 28 in accordance with the present invention includes the disc substrate 36 formed of a polycarbonate resin. The disc 28 has an outside diameter of 130 mm, and includes center hole 42 having a diameter of 15 mm. The disc alignment mechanism 40 is an annular ring located 8.3 mm from the opening 22. The annular ring has a width of 1 mm and a height of 0.5 mm. Groove 74 is located 9.6 mm from center hole 42, having a width of 0.9 and a depth of 0.3 mm. The formatted surface 38 is located 4.0 mm from the disc alignment mechanism 40.

In one embodiment, the hub 44 includes a first piece formed of pressed steel which includes a second piece 82 insert molded therein. The outside diameter of the flange member 84 is approximately 25 mm, and the outside diameter of the cylindrical side member 86 is sized for receipt in the optical disc center hole. The hub center hole 46 is 4 mm in diameter for precisely receiving the center pin 32 therethrough.

In this exemplary embodiment, the optical disc 28 has a track pitch of 0.35 $\mu$m, having an RTIR of 30 $\mu$m or less. The optical disc 28 may be a high-capacity optical disc, having a storage capacity greater than 20 gigabytes.

In one preferred embodiment, the aforementioned optical disc 28 is a single sided or dual sided magneto-optical disc having a formatted surface which may be formed therein using conventional magneto-optical technology, or may utilize magneto-optical technology, including near field recording technology (which can be similar to that disclosed in U.S. Pat. No. 5,202,880 to Lee et al.). The write/read technology of the data stored on the formatted surface 38 can utilize near field recording technology, as disclosed in U.S. Pat. No. 5,125,750 to Corle et al.

Figure 5:
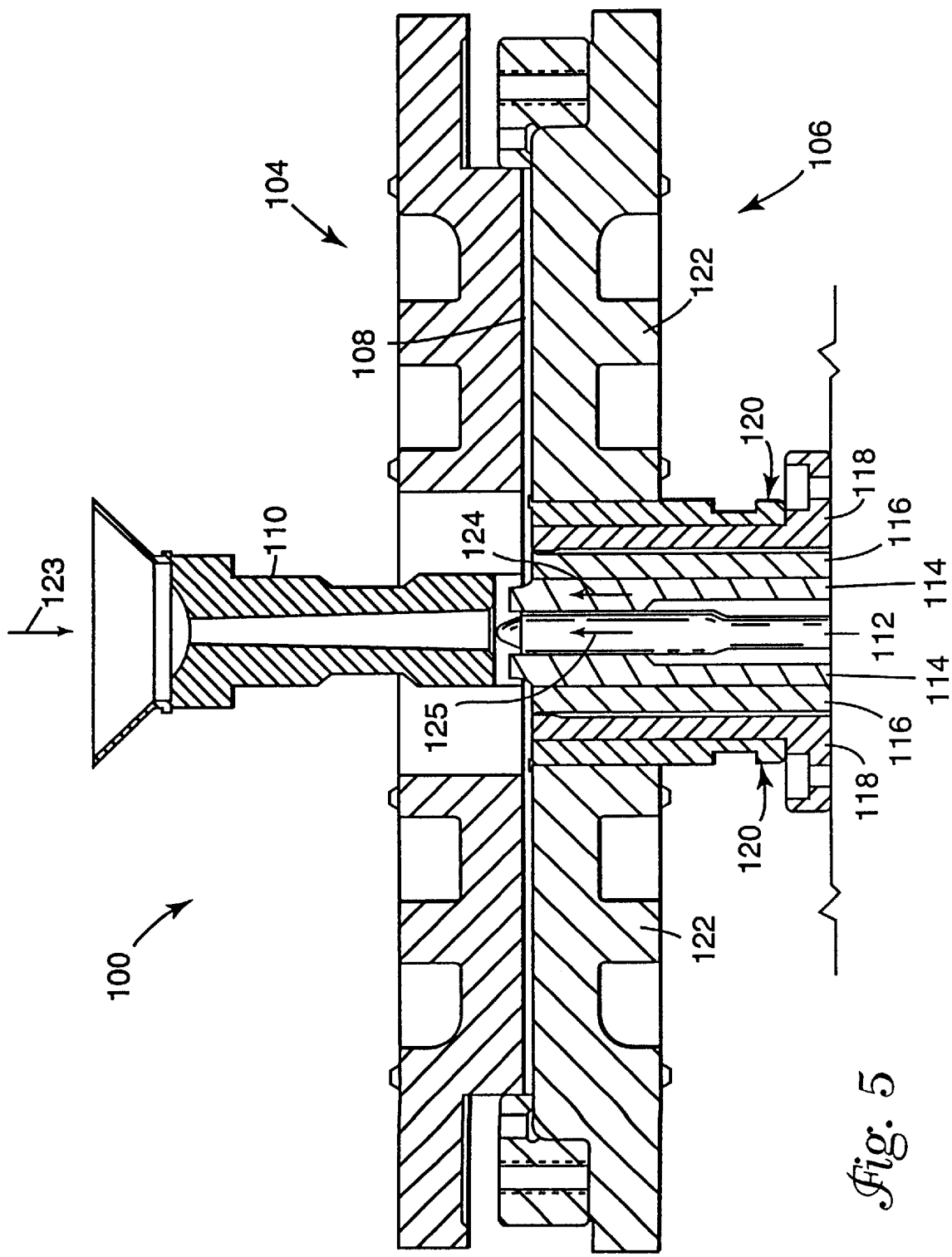
FIG. 5 is one embodiment of a tool for use in a disc molding process for producing an optical disc in accordance with the present invention.

In FIG. 5, a cross section of an optical tool for use in producing low RTIR optical discs 28 is generally shown at 100. The optical tool 100 is used for molding replicas of the optical disc 28 in a disc molding process, which can be similar to the disc molding process as previously described herein. The optical tool 100 is part of a complete optical disc molding manufacturing process (not shown), which can be a process for manufacturing CD-ROM, DVD, MO, or phase change optical discs, as previously described herein. The low RTIR optical tool 100 generally includes a fixed side 104 and a moving side 106. The fixed side 104 is movably coupled to the moving side 106 to form a disc substrate cavity 108. A sprue 110 is provided for allowing a channel for material forming the disc substrate 36, such as a polycarbonate resin, to enter the disc substrate cavity 108.

The moving side 106 includes a sprue eject 112, a gate cut 114, a product eject 116, a rod cover 118, an inner holder 120 and stamper 122. Sprue eject 112 is utilized for ejection of sprue 110 during opening of the optical tool 100. Gate cut 114 is utilized for cutting the center hole 42 within optical disc 28. Product eject 116 is utilized for ejecting the finished product replica optical disc 28 from the optical tool 100. Inner holder 120 is removable for changing out and securing stamper 122. Rod cover 118 is stationary within the moving side 106 to constrain the positions of the adjacent movable parts product eject 116 and the inner holder 120. Stamper 122 is utilized for embossing the formatted surface 38 (including the data tracks or track cycles) into optical disc 28. The stamper 122 includes data tracks. In the exemplary embodiment, for CD-ROM the stamper 122 includes tracks formed of data and pits corresponding to the data to be embossed into the formatted surface 38 of the optical disc substrate 36 during the optical disc molding process.

The process for molding a low RTIR optical disc 28 in accordance with the present invention includes filling the disc substrate cavity 108 with a disc molding material, such as polycarbonate resin, through the sprue 110 channel (indicated at 123). After the polycarbonate resin is forced into the disc substrate cavity 108, but before cooling of the polycarbonate resin, the gate cut 114 is operated forward, indicated by arrow 124, to cut center hole 42 within the optical disc substrate 36. After cooling of the resin within the disc substrate cavity 108, the formatted surface 38 has been embossed in optical disc 28, and the optical tool 100 is opened. The sprue eject 112 is operated forward (indicated by arrow 125). At the same time, the product eject 116 is operated to remove or eject the molded disc substrate 36 from the optical tool 100 surface (specifically, the surface of the moving side 106). During this process, the rod cover 118 remains stationary. The above process is repeated for the manufacture of each additional optical disc (or replica optical disc) substrate. The optical disc 28 then passes through a finishing process for forming additional layers over the disc substrate, such as reflective layers protective layers or recording layers (MO or phase change), depending on the type and use of the optical disc.

Figure 6:
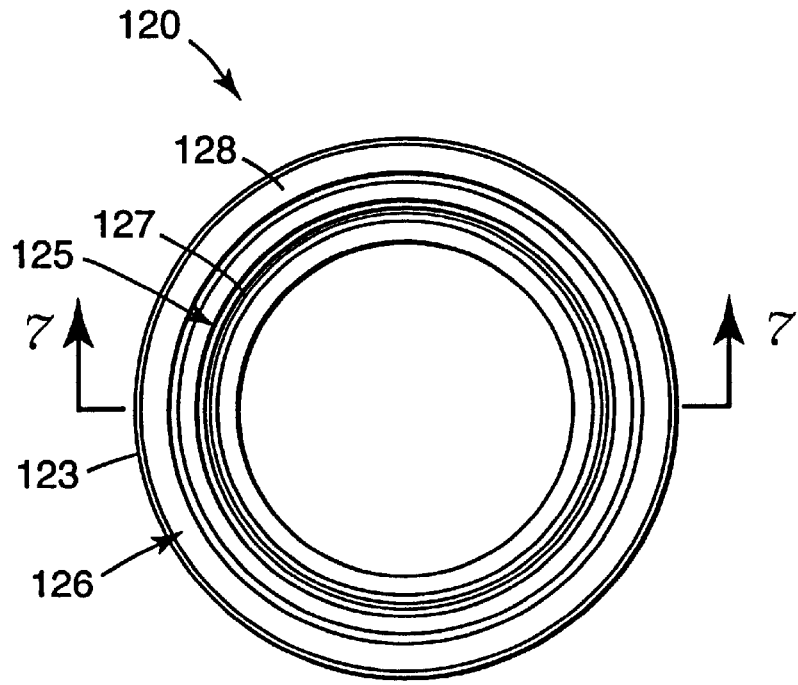
FIG. 6 is a top view of one embodiment of the inner holder shown in FIG. 5.
Figure 7:
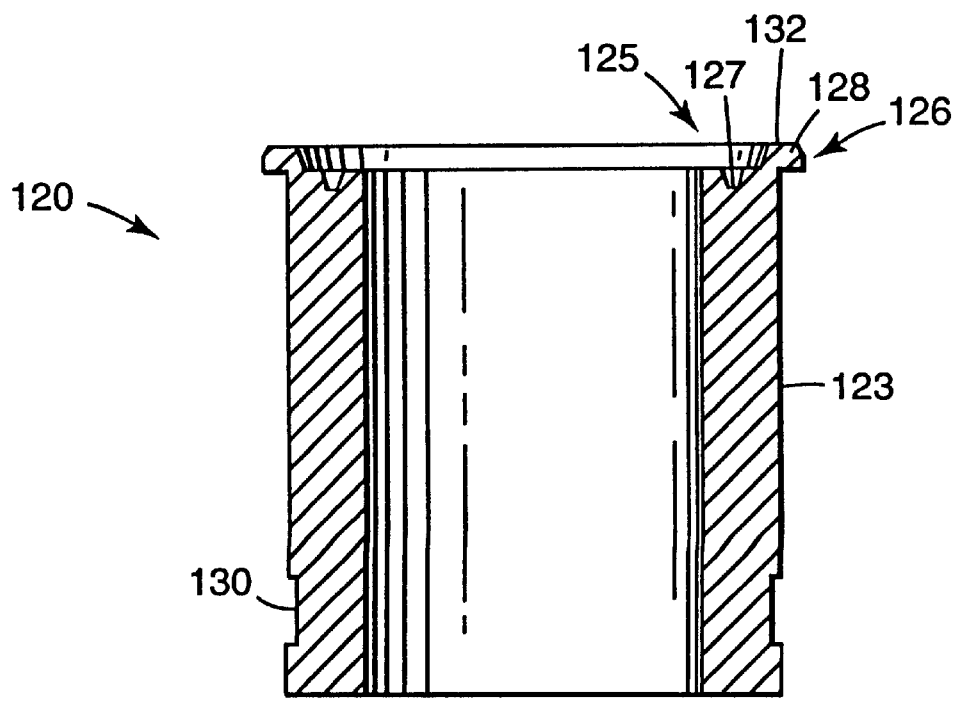
FIG. 7 is a cross-sectional view taken along line 7—7 of FIG. 6.

Referring to FIG. 6, a top view of the inner holder 120 is shown. The inner holder 120 includes a body 123, a shape imparting mechanism 125 and locking mechanism 126. The shape imparting mechanism 125 imparts a shape to the optical disc substrate 36 and the locking mechanism 126 retains the stamper 122 within optical tool 100. In the embodiment shown, the shape imparting mechanism 125 includes an annular depression 127, and the locking mechanism 126 includes an annular raised portion 128. The inner holder body 123 is generally cylindrically shaped, and is preferably formed of metal, such as stainless steel or aluminum. Referring to FIG. 7, a cross-sectional elevational view of the inner holder 120 is shown. The inner holder 120 further includes a lock down ring 130.

The inner holder 120 is secured within the optical tool 100 at the lock down ring 130. The inner holder 120 is removable from the optical tool 100 for allowing the stamper 122 to be changed out. Once a different stamper 122 is in place, the inner holder 120 is again secured to the optical tool 100 at lock down ring 130. In a locked position, the raised portion 126 extends over an edge of the stamper 122, securely retaining the stamper 122 in place.

In the exemplary embodiment shown, the inner holder 120 is utilized for forming the disc alignment mechanism 40 within the optical disc substrate 36. The inner holder 120 raised portion 128 and depression 127 are located along the top surface 132 of the inner holder 120. The shape of the top surface 132 is reflected into the optical disc substrate 36 during the disc molding process. Specifically, in the exemplary embodiment shown, depression 127 corresponds to form the disc alignment mechanism 40 shown as an annular ring and the raised portion 128 forms annular groove 74.

The unique optical tooling in accordance with the present invention produces an optical disc having a low RTIR. The stamper 122 is tightly fitted to the inner holder 120. The concentricity of the formatted information stamped into the disc substrate 36 is specified by a single metal part, such as the inner holder 120. Since the concentricity of the formatted information is specified relative to the disc alignment mechanism 40 formed by the inner holder 120, the introduction of RTIR error into the optical disc is limited to the punching of the stamper 122, the formation of the master disc and subsequent formation of the stamper, and the centering of hub 44 relative to the disc alignment mechanism 40. Any debris from the gate cut action and any non-concentricity or misinstallation of the other tool parts, such as the sprue eject 112, the gate 114, the product eject 116, and the rod cover 118 no longer will add to the resulting RTIR error stamped onto the optical disc 28. The concentricity of the formatted surface 38 is now specified relative to the disc alignment mechanism 40, and does not rely on other features of the disc, such as center hole 46.

Figure 8:
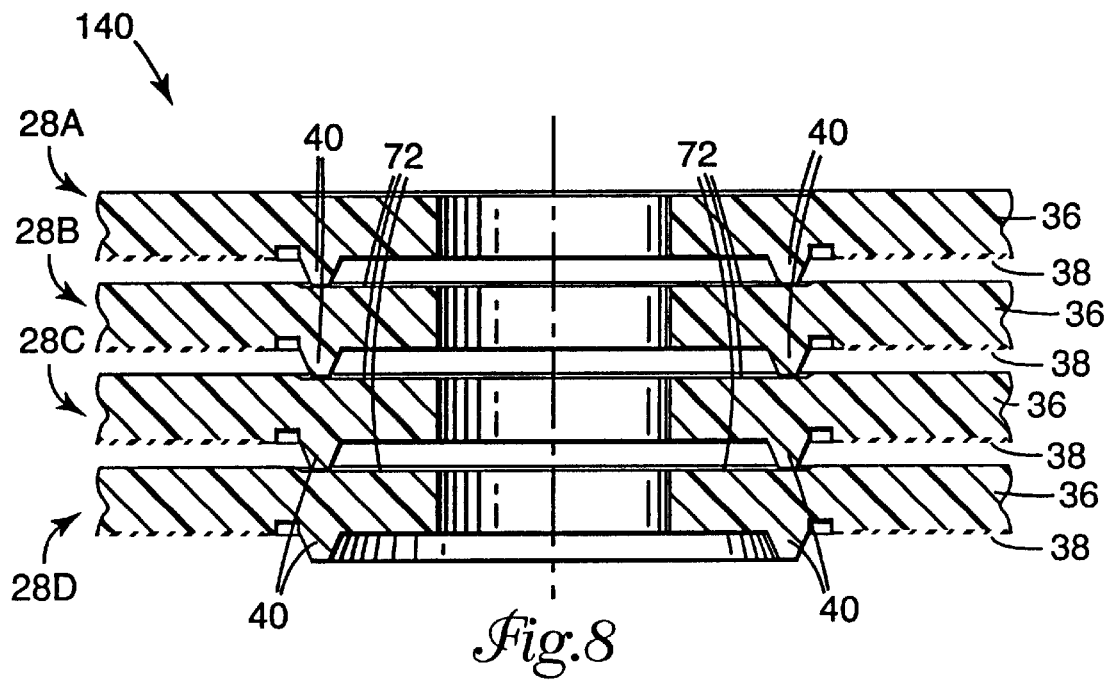
FIG. 8 is a cross-sectional view showing a plurality of optical discs utilizing the optical disc stacking mechanism in accordance with the present invention.

In FIG. 8, the use of the disc alignment mechanism 40 as a stacking mechanism during the disc manufacturing process is generally shown at 140. A plurality of optical discs 28 (indicated as 28A, 28B, 28C and 28D) (or more specifically, disc replicas), are shown stacked upon each other. The disc alignment mechanism 40 (shown as an annular ring) extends from the disc substrate 36, and is used as a stacking mechanism to aid in stacking the optical discs 28 between manufacturing steps. When used as a stacking mechanism, the disc alignment mechanism 40 provides a separation between each optical disc 28, and separates the formatted surface 38 from contact with an adjacent disc. In the exemplary embodiment shown, the optical discs 28 include a mechanism to lock the discs in a radial position relative to each other, such as the depression 72 shown to further aid in stacking the optical discs 28. The optical discs 28 are formed such that when stacked, the disc alignment mechanism 40 sits or fits just inside depression 72. As such, depression 72 adds radial (or lateral) stability to the stacked optical discs 28. The depression 72 inhibits individual movement of the optical disc 28 in the radial direction relative to an adjacent optical disc.

With the disc alignment mechanism 40 in accordance with the present invention, the disc alignment mechanism 40 may be used as a disc stacking mechanism during the manufacturing process. With disc alignment mechanism 40, it becomes no longer necessary to store each individual optical disc 28 in individual disc cartridges in between steps of the manufacturing process. The optical disc 28 may be neatly stacked without causing damage to each other. Although only four optical discs 28 are shown stacked, it is recognized that many optical discs 28 may be stacked on top of each other.

Figure 9:
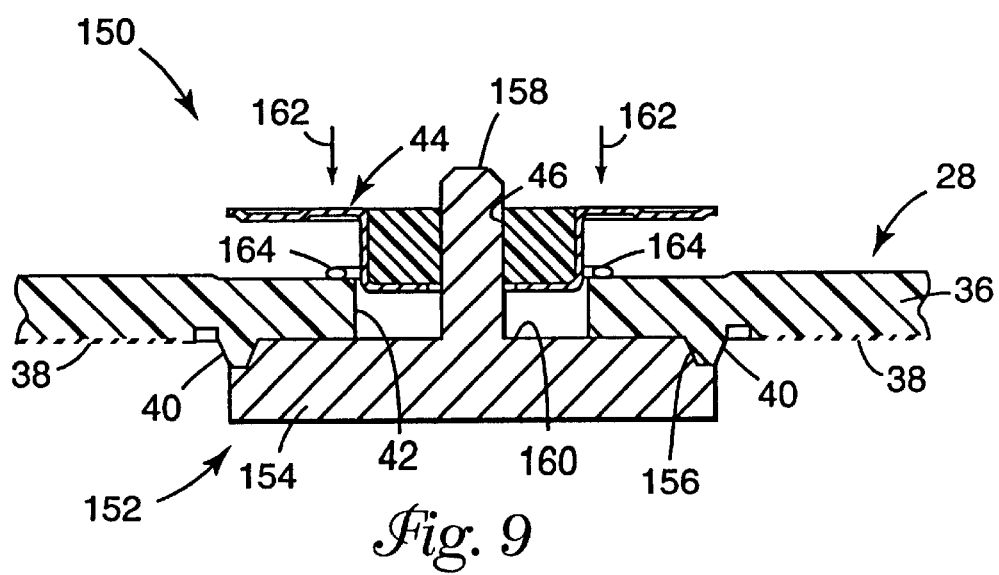
FIG. 9 is a partial cross-sectional view showing a step in manufacturing an optical disc for use in an optical disc storage system in accordance with the present invention.

In FIG. 9, one embodiment of a method of centering the hub 44 relative to the formatted surface 38, and in particular, disc alignment mechanism 40 is shown at 150. This embodiment includes a jig 152 including a jig body 154, a mating mechanism 156 (such as the annular groove shown), and a jig spindle 158. The jig body 154 is generally cylindrically shaped. The annular groove 156 is located about a top surface 160, and corresponds to and is matable with the disc alignment mechanism 140 located in optical disc 28. The jig spindle 158 is precisely centered on the top surface 160 of the jig 152, having a size and shape corresponding to the disc drive spindle 30. Although the disc alignment mechanism 140 is shown as an annular ridge, it is recognized it may take on other forms, such as an annular groove or pin, which are capable of mating with a corresponding mating mechanism 156.

In operation, the hub 44 is centered relative to the disc alignment mechanism 40 by first placing the hubless optical disc 28 on the jig 152, with the disc alignment mechanism 40 placed within jig annular groove 156. A bead of adhesive is placed about the center hole 42 on disc surface 70, and specifically within depression 72. The hub 44 is placed over jig 152 (indicated by arrows 162) by placing the hub center hole 46 over the jig spindle 158. Using this simple centering process, the hub 44 is now secured within center hole 42 and centered relative to disc alignment mechanism 40 (and more importantly, formatted surface 38). In one preferred embodiment, the jig annular groove 156 is at least 0.5 mm deep relative to the top surface of the jig 152, and is shaped for mating or coupling with the disc alignment mechanism 40.

Figure 10:
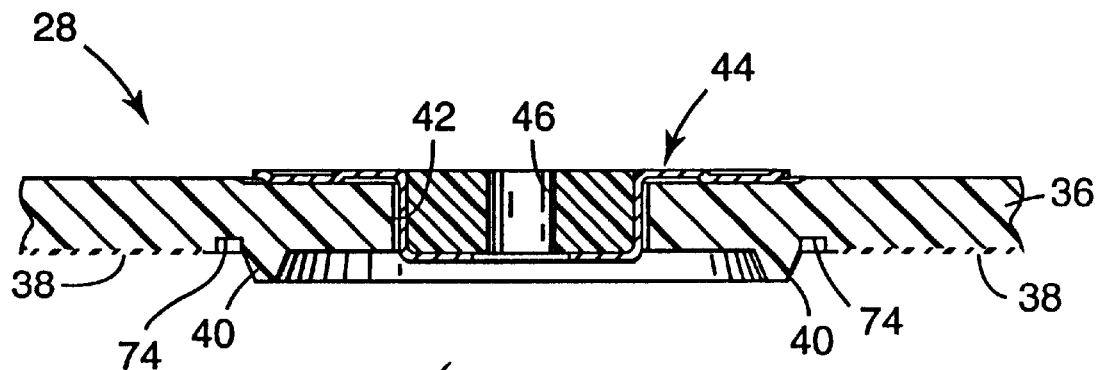
FIG. 10 is a partial cross-sectional view showing an assembled optical disc having a hub centered therein for use in an optical disc storage system in accordance with the present invention.

Referring to FIG. 10, after the adhesive 164 dries, the completed optical disc 28 may be removed from the jig 152 for installation within the cartridge shell 26 (not shown). It is also recognized that the hub 44 may be centered relative to the disc alignment mechanism 40 using other known centering processes, which may be more costly or less efficient, such as the use of a camera system.

Figure 11:
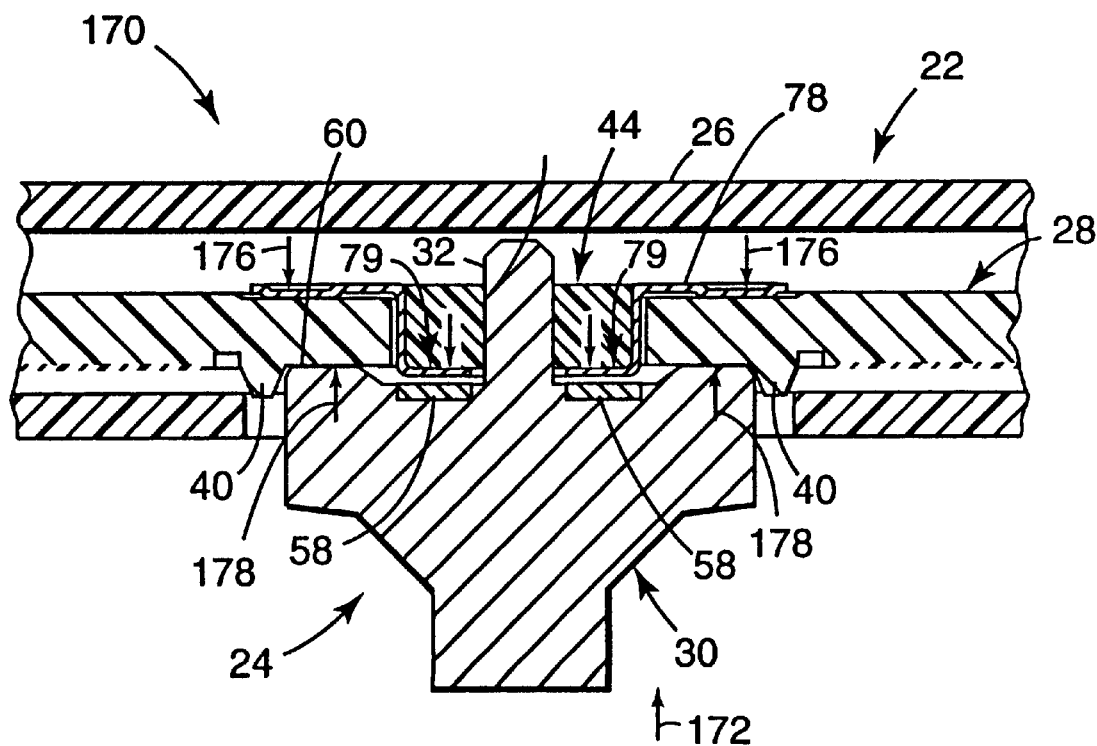
FIG. 11 is a partial cross-sectional view showing one embodiment of the optical storage system in accordance with the present invention in operation.

In FIG. 11, optical storage system 20 is shown in operation. In particular, the interaction between the optical disc 28 and the optical disc drive spindle 30 is shown and will be described herein.

In operation, the optical disc cartridge 22 is placed within the optical disc reader 24 (partially shown). The optical disc drive spindle is operated upward (indicated by directional arrow 172) to engage or couple with the optical disc 28. In particular, the center pin 32 is precisely received within the hub center hole 46 for centering the optical disc drive spindle 30 to the data tracks on the formatted surface 38. Although the hub 44 is generally centered within the center hole 42, the hub 44 is precisely centered relative to the disc alignment mechanism 40. In turn, the concentricity of the data tracks on the formatted surface 38 has been registered relative to the disc alignment mechanism 40 during the disc manufacturing process.

As the optical disc drive spindle 30 is brought forward, the optical disc 28 contacts and seats on the flange surface 60. When in an engaged position, the optical disc drive spindle coupling mechanism 58 is aligned with the hub coupling mechanism 79. An electromagnetic force is applied in the normal direction for retaining the optical disc 28 against the optical disc drive spindle 30. In one embodiment, the electromagnetic force is 1–2 pounds/foot. This coupling action results in a compression force between the hub flange 78, indicated at 176, and the optical disc drive spindle flange surface 60, indicated at 178.

With the unique design in accordance with the present invention, the adhesive holding the hub 44 to the optical disc substrate 36 is stressed favorably in compression and shear during operation, making it almost impossible for the hub 44 to be displaced from the optical disc center hole 42. Further, since the hub flange compression force 176 and the drive spindle flange compression force 178 are in direct alignment, the media will not be caused to be warped since there is a zero clamp moment on the disc substrate 38.

Upon removal of the electromagnetic force between the drive spindle coupling mechanism 58 and the hub coupling mechanism 79, the drive spindle 30 may be disengaged from the optical disc 28.

As previously described herein, the concentricity of the formatted surface 38 is linked to the registration provided by the disc alignment mechanism 40 (formed by the inner holder 120 during the disc molding process). The hub center hole 46 is centered with the disc alignment mechanism 40. As such, when the optical disc drive spindle center pin 32 is precisely fit within the hub center hole 46, the optical disc drive spindle 30 is centered relative to the data tracks on the formatted surface 38.

Since the process of manufacturing the optical disc 28 results in an optical disc having a low RTIR error, the optical disc 28 in accordance with the present invention is very useful for high-capacity optical discs. The high-capacity optical disc having a low RTIR error utilizes a hub which is precisely centered relative to the disc alignment mechanism 40. In a preferred embodiment, the hub 44 is precisely centered relative to the disc alignment mechanism 40 using a jig centering process.

Figure 12:
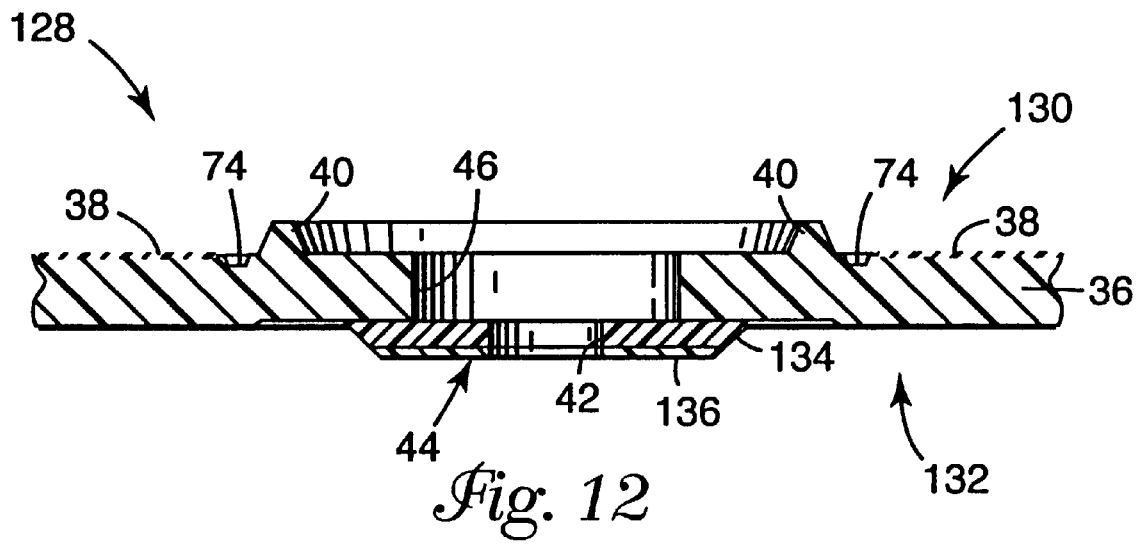
FIG. 12 is a partial cross-sectional view of a second embodiment of an optical disc in accordance with the present invention.

In FIG. 12, a partial cross-sectional view of another embodiment of the optical disc in accordance with the present invention is shown at 128 (for clarity, the disc cartridge shell is not shown). The optical disc 128 can be similar to the optical disc 28 as previously described herein. The optical disc 128 includes a read side 130 and a non-read side 132. The formatted surface 38 and disc alignment mechanism 40 are located on read side 130. The data tracks on the formatted surface 38 are concentrically registered to the disc alignment mechanism 40 during the molding of the disc substrate 36, using processes as previously described herein.

Hub assembly 44 is located on non-read side 132. Hub assembly 44 is centered relative to the disc alignment mechanism 40, and as such, is also centered relative to the data tracks on the formatted surface 38. The hub assembly 44 extends across center hole 42, and in one embodiment, is centered relative to the disc alignment mechanism 40 using a jig centering process as previously described herein. Alternatively, it is recognized that the hub assembly 44 may be centered on disc substrate 36 using other centering processes, such as a camera system.

In one exemplary embodiment, the hub assembly 44 extends across center hole 42, but does not extend into center hole 42. The hub assembly includes a first piece 134 and a second piece 136. The first piece 134 may be formed of a polymeric composite, and the second piece 136 may be a magnetically active segment, and can be formed of a ferro magnetic material to aid in magnetically coupling the optical disc 128 to a drive spindle, as previously described herein. The hub assembly 44 may be generally disc shaped and formed using an insert molding process. Once the hub center hole 46 is centered relative to the disc alignment mechanism 40, the hub assembly 44 may be secured to the disc substrate 36 using an adhesive.

Figure 13:
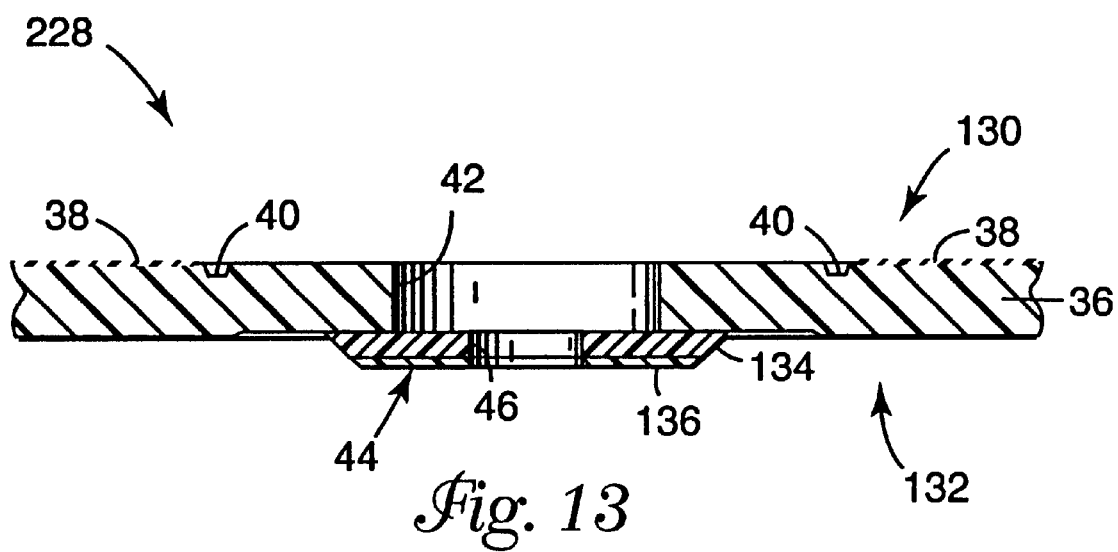
FIG. 13 is a partial cross-sectional view of a third embodiment of an optical disc in accordance with the present invention.

In FIG. 13, a partial cross-sectional view of another embodiment of the optical disc in accordance with the present invention is generally shown at 228. The optical disc 228 can be similar to the optical disc 128 and optical disc 28 as previously described herein. In this embodiment, the disc alignment mechanism 40, located on read side 130, is concentrically registered relative to the data tracks on the formatted surface 38. The disc alignment mechanism 40 simply consists of a single annular groove formed into the disc substrate 36 during the disc molding process. The disc alignment mechanism 40 can be formed into the disc substrate 30 using the shaped surface of the optical tool inner holder 120 (as shown in FIG. 6 and 7). In this embodiment, the disc alignment mechanism 40 is reflected into the surface of the disc substrate 36 using raised portion 128, which also functions to extend over an edge of the stamper 122, securely retaining the stamper 122 in place. The disc alignment mechanism 40 is capable of mating with a jig mechanism (such as jig 152 shown in FIG. 9) for centering the hub assembly 144 on the disc substrate 36 relative to the disc alignment mechanism 40. It is also recognized that the disc alignment mechanism 40 may be reflected into the disc substrate 36 using other disc tooling members, such as the stamper 122.

With disc alignment mechanism 40, the hub assembly 44 may be centered across center hole 42 relative to the disc alignment mechanism 40 using a centering process, such as the jig centering process previously described herein. Although the hub assembly 44 is generally centered across center hole 42, the hub center hole 46 is precisely centered relative to disc alignment mechanism 40. When placed over the drive spindle of a disc drive mechanism, the data tracks on the formatted surface are concentrically registered and centered on the drive spindle.

Using the centering process in accordance with the present invention, the optical discs 28, 128 and 228 can be high capacity optical discs, having a high capacity of data encoded therein, while having a low RTIR error due to the precise centering and concentric registration of the data tracks as described herein. The disc alignment mechanism 40 in accordance with the present invention allows the data tracks of the formatted surface 38 to be precisely registered relative to the disc alignment mechanism 40 during the disc molding process, while avoiding the introduction of a high RTIR error inherent in conventional disc molding processes.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. An optical storage system including a disc drive and an optical media having a low radial total indicated runout, the optical media comprising:
   a disc substrate having a center hole, the disc substrate including a formatted surface and central region, wherein the central region is located between the formatted surface and the center hole;
   a disc alignment mechanism located within the central region and having a center axis, wherein the formatted surface is concentrically registered and the concentric registration of the formatted surface is specified relative to the disc alignment mechanism; and
   a hub having a hub center hole, the hub secured to only one side of the disc substrate and including a hub center wherein the hub center is precisely located concentric with the center axis of the disc alignment mechanism such that the hub center hole is centered relative to the disc alignment mechanism using the disc alignment mechanism in a separate centering process, wherein the hub is not receivable by the disc alignment mechanism; and
   the disc drive comprising:
      a drive spindle: and
         a center pin extending from the drive spindle for centering the drive spindle to the optical media.

2. The optical storage system of claim 1, wherein the formatted surface includes a plurality of generally concentric tracks, wherein each track can be defined as a concentric ring or a cycle of a spiral of a track.

3. The optical storage system of claim 1, wherein the disc alignment mechanism is integrally molded with the disc substrate.

4. The optical storage system of claim 1, wherein the disc alignment mechanism includes an annular ridge extending from the disc substrate.

5. The optical storage system of claim 1, further comprising means for coupling the drive spindle to the optical media.

6. The optical storage system of claim 5, wherein the means for coupling further comprises a magnetic material coupled to the drive spindle for magnetically coupling the optical media to the drive spindle.

7. An optical disc for the storage of a high capacity of information therein, the optical disc comprising:
   a disc substrate having a center hole, the disc substrate including a formatted surface and a central region, wherein the formatted surface includes a plurality of spiral or concentric tracks, and wherein the central region is located between the formatted surface and the center hole;
   a disc alignment mechanism located within the central region and having a center axis, wherein the formatted surface is concentrically registered and the concentric registration of the formatted surface is specified relative to the disc alignment mechanism; and
   a hub having a hub center, the hub secured to only one side of the disc substrate and positioned at the center hole, wherein the hub center is precisely located concentric with the center axis of the disc alignment mechanism, such that the hub is centered relative to the disc alignment mechanism using the disc alignment mechanism in a separate centering process, wherein the hub is not receivable by the disc alignment mechanism.

8. The optical disc of claim 7, wherein the disc alignment mechanism includes an annular ridge.

9. The optical disc of claim 7, wherein the disc alignment mechanism is integrally molded with the disc substrate.

10. The optical disc of claim 7, wherein the optical disc has a low radial total indicated runout error.

11. The optical disc of claim 7, wherein the hub includes a hub coupling mechanism for coupling the hub to a disc drive.

12. The optical disc of claim 11, wherein the hub coupling mechanism is formed of a ferromagnetic material.

13. The optical disc of claim 7, wherein the hub is formed of a polymer material having a high density of magnetic material contained therein.

14. The optical disc of claim 7, wherein the hub is formed of a composite magnetic polymer.

15. The optical disc of claim 7, wherein the hub comprises:
   a generally cylindrically shaped body; and
   a flange extending from the generally cylindrically shaped body.

16. The optical disc of claim 15, wherein the flange is secured to the disc substrate.

17. The optical disc of claim 16, wherein the disc substrate includes a surface having a depression located about the center hole, and wherein the flange is secured to the disc substrate within the depression.

18. The optical disc of claim 17, wherein the depth of the depression is greater than the thickness of the flange.

19. The optical disc of claim 7, further comprising means integral the disc substrate for providing radial support during stacking of the optical disc substrate, wherein the disc alignment mechanism is in vertical alignment with the means for providing radial support, thereby providing a stacking mechanism.

20. The optical disc of claim 19, wherein the means for providing radial support is a depression in the disc surface.

* * * * *